US008903554B2

(12) United States Patent
Stagner

(10) Patent No.: US 8,903,554 B2
(45) Date of Patent: Dec. 2, 2014

(54) ENERGY PLANT DESIGN AND OPERATION

(75) Inventor: Joseph C Stagner, El Dorado Hills, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 422 days.

(21) Appl. No.: 13/397,453

(22) Filed: Feb. 15, 2012

(65) Prior Publication Data

US 2012/0215362 A1    Aug. 23, 2012

Related U.S. Application Data

(60) Provisional application No. 61/445,475, filed on Feb. 22, 2011.

(51) Int. Cl.
*G05B 13/00*  (2006.01)
*G06Q 10/00*  (2012.01)

(52) U.S. Cl.
CPC ....................................... *G06Q 10/00* (2013.01)
USPC ............................ 700/278; 136/201; 429/423

(58) Field of Classification Search
USPC .................... 700/278, 291; 136/201; 429/423
See application file for complete search history.

(56) References Cited

U.S. PATENT DOCUMENTS

| | | | | |
|---|---|---|---|---|
| 2002/0080907 | A1* | 6/2002 | Rubbia | 376/318 |
| 2007/0258830 | A1* | 11/2007 | Todd | 417/52 |
| 2009/0246442 | A1* | 10/2009 | Sexton et al. | 428/64.4 |
| 2011/0001324 | A1* | 1/2011 | Landis et al. | 290/40 B |
| 2011/0030753 | A1* | 2/2011 | Weaver et al. | 136/201 |
| 2011/0129745 | A1* | 6/2011 | Givens et al. | 429/423 |
| 2012/0010757 | A1* | 1/2012 | Francino et al. | 700/291 |

* cited by examiner

*Primary Examiner* — Mohammad Ali
*Assistant Examiner* — Anthony Whittington
(74) *Attorney, Agent, or Firm* — Lumen Patent Firm

(57) ABSTRACT

A forward-looking method and system is provided for determining an economically optimal energy dispatching schema to meet the combined demands of heating, cooling and electrical by an energy plant and a facilities plant. The optimal energy dispatching schema is determined for each of a plurality of incremental time segments defined in a forward-looking time period by optimizing these loads. The schema can be used for real time energy dispatching by the energy plant, in an existing energy plant optimization, and/or a new energy plant planning and design over the forward looking time period or any other forward-looking time period.

15 Claims, 4 Drawing Sheets

ENERGY PLANT DESIGN AND OPERATION

CROSS-REFERENCE TO RELATED APPLICATIONS

This application claims priority from U.S. Provisional Patent Application 61/445,475 filed Feb. 22, 2011, which is incorporated herein by reference.

FIELD OF THE INVENTION

The invention relates to methods and systems for optimal (efficient and economical) design and operation of energy plants including heating and cooling equipment.

BACKGROUND OF THE INVENTION

With increasing energy costs, climate impacts and higher demands, a powerful technology is needed for optimal economic planning, design, and operation of heating and cooling plants. Such technology can produce significant cost, greenhouse gas, and water savings depending on the current design and operation of a given plant, without capital outlay for plant improvements. In addition, the development of such technology could allow plant designers and operators to intelligently and effectively address the challenges and opportunities presented by time-of-use energy pricing, thermal storage, heat recovery, carbon monetization, water supply limitations, and other major factors affecting central energy production for large commercial and industrial complexes such as universities, military bases, and corporate campuses that employ heating and cooling plants.

The present invention addresses at least some of the issues and advances the art with methods and systems for optimal economic planning, design, and operation of heating and cooling plants.

SUMMARY OF THE INVENTION

A forward-looking method and system is provided for determining an economically optimal energy dispatching schema to meet the combined demands of heating, cooling and electrical. One the one hand, we have an energy plant with a plurality of heating and cooling equipment for producing heat and cooling, and each piece of equipment consumes electricity for producing the required/demanded heat and cooling. Examples of such equipment, without any limitations, are one or more heaters, one or more chillers, one or more heat recovery chillers, one or more hot thermal storage tanks, and one or more cold thermal storage tanks. One the other hand, we have a facilities plant with a plurality of facilities which consume electricity and at least some of these facilities also consume the produced heat and cooling from the energy plant. In general, examples of the type of energy used is electricity, a gaseous fuel, a liquid fuel, a solid fuel, a natural gas, hydrogen, diesel, fuel oil, biomass, or coal.

A computer-implemented program executable on a computer is used for determining the economically optimal energy dispatching schema to meet the heating, cooling and electrical loads by the energy plant and the facilities plant. This program calculates (in a semi-automatic or automatic fashion) the optimal energy dispatching schema for each of a plurality of incremental time segments defined in a forward-looking time period by optimizing the combined heating, cooling, and electrical loads.

The incremental time segment can be user defined or automatically set in or by the program and can for example be defined in seconds, minutes, day, weeks, months, or years. The forward-looking time period is at least seven days and includes at least one weekend. In one example, the forward-looking time period is one or more weeks, one or more months, or one or more years. It is noted that the program looks forward in time to determine not only the optimal economic dispatching of the energy plant at a current point in time, but also in every time increment from the current to the end of the specific forward looking time period.

There are several calculation steps or modules that in any combination could be integrated in this program with the goal of this predictive forward modeling to optimize economic efficiency for heating, cooling and electricity demands. The determined optimal energy dispatching schema can, for example, be used in a variety of ways such as, for example and without any limitations, for (p) real time energy dispatching by the energy plant for one or more of the plurality of incremental time segments defined in the forward-looking time period, (pp) an existing energy plant optimization over the forward looking time period, (ppp) a new energy plant planning and design over the forward looking time period or any other forward-looking time period. In an additional example, the method and system extends to using the determined optimal energy dispatching schema for design and planning over a second forward looking time period (e.g. defined in terms of one or more weeks, one or more months, or one or more years).

In one aspect, the program performs economic dispatching in two-phases: the first preproduction phase and a second production dispatching phase which complements one or more (or all) shortcomings from the first phase. In this aspect, an unmet volume of heating and cooling load is calculated that cannot be met by thermal storage discharge from one or more hot thermal storage tanks and/or one or more cold storage tanks. A first complementary volume of heating and/or cooling production is calculated to complement the unmet volume of heating and cooling load (i) by using preproduction dispatching from: (j) one or more heat recovery chillers, (jj) one or more heaters, (jjj) one or more chillers, or a combination thereof. A second complementary volume of heating and cooling production, thermal storage discharge and/or thermal storage recharge is calculated to complement the unmet volume that cannot be met by (i)-(ii) by using standard production dispatching from: (k) one or more heat recovery chillers, (kk) one or more heaters, (kkk) one or more chillers, or a combination thereof.

In another aspect, the program of calculating the optimal energy dispatching schema for each of the plurality of incremental time segments defined in the forward-looking time period could further include calculating a maximum amount of electricity that may be consumed by the energy plant given a total electricity limitation that may be imposed by one or more aspects of the economically optimal energy optimization, by one or more regulatory directions in the interest of electric grid management safety, or a combination thereof.

In yet another aspect, the program of calculating the optimal energy dispatching schema for each of the plurality of incremental time segments defined in the forward-looking time period could further include calculating any heating supply temperature boost that must be provided by one or more heaters due to limitations in maximum temperature lift capabilities of one or more heat recovery chillers.

In yet another aspect, the program of calculating the optimal energy dispatching schema for each of the plurality of incremental time segments defined in the forward-looking time period could further include determining and using weather forecasts for the facilities to be served by the energy plant.

In still another aspect, the program of calculating the optimal energy dispatching schema for each of the plurality of incremental time segments defined in the forward-looking time period could further include determining and using electricity, heating, and cooling loads for the facilities to be served by the energy plant.

In still another aspect, the program of calculating the optimal energy dispatching schema for each of the plurality of incremental time segments defined in the forward-looking time period could further include determining and using energy commodity costs for each type of energy to be consumed in the energy plant.

In still another aspect, the program of calculating the optimal energy dispatching schema for each of the plurality of incremental time segments defined in the forward-looking time period could further include determining and using an energy efficiency of each of piece of equipment in the energy plant.

In still another aspect, the program of calculating the optimal energy dispatching schema for each of the plurality of incremental time segments defined in the forward-looking time period could further include determining and using an available production capacity of each piece of equipment in the energy plant.

In still another aspect, the program of calculating the optimal energy dispatching schema for each of the plurality of incremental time segments defined in the forward-looking time period could further include determining and using an available maximum storage capacity, an actual energy storage volume, a maximum recharge rate, a maximum discharge rate, or a combination thereof of the hot and cold thermal storage tanks in the energy plant.

It is noted that the program optimizes plant operation for economics based not only on its thermal energy performance, but also on the combination of its concurrent electricity demand with that of the facilities it serves. In other words, it can be used to determine optimal economic plant operation considering the combined electricity demand (peak electricity demand in specified period) of it and the facilities it serves, such as for example a University Campus. For example, suppose one were to run a thermal energy plant optimization program and the program output what it thought were the optimal plant dispatching instructions based on the costs of energy to the plant alone (including electricity demand charges), but the plant was only part of the total electrical demand seen at the electrical meter that serves it, with the balance of electricity flowing through the meter (such as a campuswide electrical meter) coming from other facilities such as buildings behind that meter. The method and system of the present invention predicts the electrical demands of the other facilities behind the meter this information could be used to dispatch the thermal energy plant in a way that complements rather than combines its electricity demand with that of the other facilities served behind the meter to minimize the overall costs of energy to the campus.

DETAILED DESCRIPTION

Legends

Figure 1:
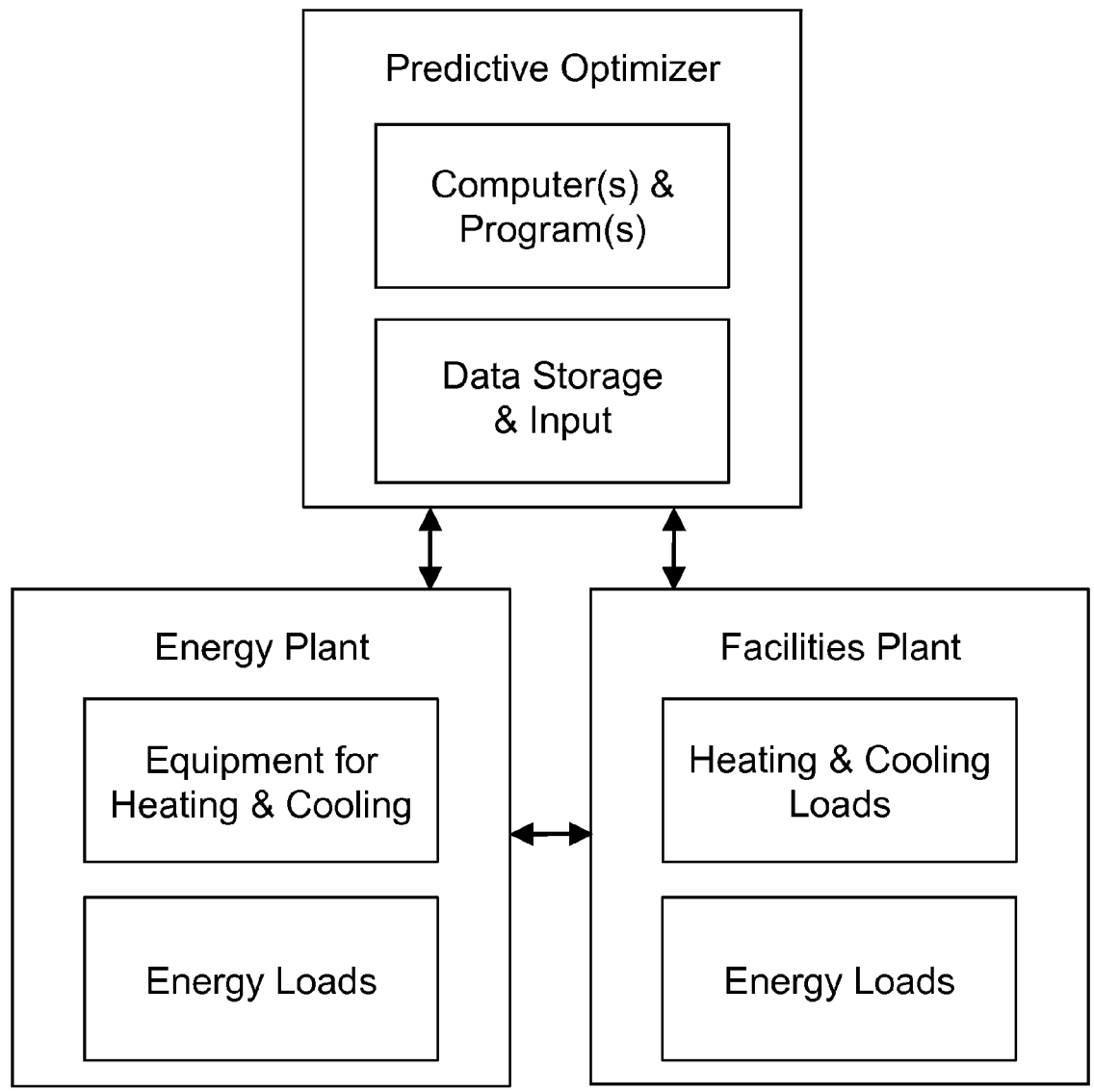
FIG. 1 shows an overview of the method and system according to an exemplary embodiment of the invention.

HLh Heating load this hour
HSLh Heating load remaining in this hour after preproduction dispatching
HLc Cumulative heating load through this hour
HWh Heating work already dispatched this hour
HSWh Heating work already dispatched in this hour in standard production dispatching
HWc Cumulative heating work already dispatched through this hour
HTESmdr Hot thermal storage tank maximum hourly discharge rate
HTESmrr Hot thermal storage tank maximum hourly recharge rate
HTESf0 Hot thermal storage tank freeboard at start of period
HTESbfs Maximum hot thermal storage tank balance after preproduction dispatching in any hour equal to or after the current hour
HTEScap Hot thermal storage tank capacity
CLh Chilling load this hour
CSLt Total Chilling load remaining over period modeled after preproduction dispatching
CSLh Chilling load remaining in this hour after preproduction dispatching
CLc Cumulative chilling load through this hour
CWh Chilling work already dispatched this hour
CSWh Chilling work already dispatched in this hour in standard production dispatching
CWc Cumulative chilling work already dispatched through this hour
CTESmdr Cold thermal storage tank maximum hourly discharge rate
CTESmrr Cold thermal storage tank maximum hourly recharge rate
CTESf0 Cold thermal storage tank freeboard at start of period
CTESf0S Cold thermal storage tank freeboard at start of period after preproduction dispatching
CTESffS Minimum cold thermal storage tank freeboard after preproduction dispatching in any hour equal to or after the current hour
CTESbpS Minimum cold thermal storage tank balance after preproduction dispatching in any hour before the current hour
CTESbfS Maximum cold thermal storage tank balance after preproduction dispatching in any hour equal to or after the current hour
CTEScap Cold thermal storage tank capacity
HRCcap HRC maximum capacity this hour
HRCtd HRC minimum capacity this hour
HRCcapsp HRC maximum capacity remaining this hour after preproduction dispatching
HRCpe HRC production efficiency this hour
HRCpph HRC preproduction dispatched this hour
CHLcap Chiller maximum capacity this hour
CHLtd Chiller minimum capacity this hour
CHLcapsp Chiller maximum capacity remaining this hour after preproduction dispatching
CHLpe Chiller production efficiency this hour
CHLpes Steam chiller electrical production efficiency this hour
HTRcap Hot Water Generator/Boiler maximum capacity this hour
HTRtd Hot Water Generator/Boiler minimum capacity this hour HTRcapsp Hot Water Generator/Boiler maximum capacity remaining this hour after preproduction dispatching HTRpe Hot Water Generator/Boiler production efficiency this hour Eph Maximum allowable electrical peak demand this hour Epphrc Electricity required for HRC preproduction already dispatched in this hour Eppchl Electricity required for Chiller preproduction already dispatched in this hour Epphtr Electricity required for heaters preproduction already dispatched in this hour Esphrc Electricity required for HRC standard production already dispatched in this hour Espchl Electricity required for Chiller standard production already dispatched in this hour Esphtr Electricity required for heaters standard production already dispatched in this hour The present invention is a method or system for achieving optimal economic planning, design, and operation of heating and cooling plants. Embodiments of the invention can be implemented as a system integrating different operational devices and methods as well as a computer-implemented method or program(s) executable by one or more computers.

Use of the embodiments of the invention can produce cost, greenhouse gas, and water savings of 5% to 30%, or more, depending on the design and operation of a given plant, without capital outlay for plant improvements. The method will allow plant designers and operators to master the challenges and opportunities presented by time-of-use energy pricing, thermal storage, heat recovery, carbon monetization, water supply limitations, and other major factors affecting central energy production for large commercial and industrial complexes such as universities, military bases, and corporate campuses that employ heating and cooling plants.

The method may be used for conventional separate heating and cooling plants using boilers and chillers, as well as more advanced combined heating and cooling plants also featuring heat recovery chillers, heat pumps, and both hot and cold thermal storage. It may also be used for conceptual economic planning of plant changes, expansions, or full replacement; for specification of initial and long term plant equipment schedules in the design phase; and for manual or automated operation of the plant after construction including real time hourly plant dispatching based on near term (e.g. 10 day) forward looking weather, loads, equipment performance and availability, thermal storage balances, and time-of-use energy prices.

In one example the method was developed for planning, designing, and operating a new heat recovery based combined heat and cooling "regeneration" plant to replace Stanford's campus gas fired combined heat and power cogeneration plant. The method was developed because no commercially available program to perform these functions adequately could be identified for the University to use in designing and operating its new campus regeneration system, and for optimizing current plant operations before the new plant is operational.

Currently available energy plant optimization programs typically only examine equipment performance factors and energy prices at an instantaneous point in time to determine the most economical way to operate the plant at that point in time for those given conditions. However, given that energy prices and equipment performance factors change on an hourly basis, and that thermal storage can be used to defer energy production to lower cost periods over the course of a week, these programs are inadequate for determining the optimal way to use plant production equipment and thermal storage over multi-day periods to minimize cost while meeting demands.

The method according to one or more embodiments of this invention examines forward looking (predictive) time-of-use energy prices, equipment performance factors and availability, and thermal storage potential over periods of a week or longer to determine the optimal way to use the production equipment and thermal storage to achieve the lowest cost for meeting loads over the extended period. The method can be used for both real-time optimization of energy plant dispatching and for optimizing plant designs and expansions to cover multi-year horizons.

Because existing methods cannot "think ahead" they cannot be used to inform optimal plant designs or expansions, nor properly estimate the cost of energy to operate the plant. The sum of 8,760 hourly plant optimization calculations cannot yield an optimal plant design and operation scheme over the course of time, when thermal storage and the concept of deferring work to lower cost future periods is considered. Indeed any optimization program that only considers plant conditions at a certain point in time cannot even recognize the economic potential of thermal energy storage.

Also, because heat recovery on an industrial scale is less common, and the use of heat recovery and hot water thermal storage for combined heating and cooling operations is even more rare, most currently available energy plant optimization programs are also not equipped to model heat recovery and combined heating and cooling operations as this program does. Given this and the powerful analysis tools included, the method can adeptly identify and open up significant new possibilities for reducing the cost, GHG emissions, and water use required to meet facility heating and cooling loads.

Examples of Advantages

Embodiments of the invention could have one or more of the following advantages:
  Powerful yet easy to use, as the method was designed and is in use by facilities executives, plant managers, and engineers engaged in the long range planning, design, and operation of a large state of the art heating and cooling plant at a major university.
  Designed for use with a full range of conventional separate heating and cooling plants all the way to innovative combined heating and cooling plants featuring heat recovery and both hot and cold thermal storage.
  Reduces capital and operating costs of energy plants significantly without capital outlay, with an expected savings of cost, GHG emissions, and water use from 5% to 30% depending upon current plant design and operational efficiency.
  Can save tens of thousands to tens of millions of dollars per year, depending on plant size and current efficiency, in many cases without capital outlay.
  Determines optimal specifications, equipment installation, and operating schedules for plant equipment and thermal storage over extended time periods, as opposed to current optimization programs which work only at a single point in time and cannot be used for strategies incorporating time-of-use energy pricing, thermal storage, and other time based factors.

Examples of Use

Embodiments of the invention could be used in the following scenarios.
  There are thousands of central heating and cooling plants at universities, military bases, and commercial complexes in the United States and throughout the world using hundreds of thousands to tens of millions of dollars in energy, per year, each, to provide heating and cooling services to their customers. A 5% savings in energy cost for current operations achieved with this method at just one major university represents a savings of over a million dollars per year, without requiring capital outlay.

With increasing load growth, energy costs, GHG emissions and water restrictions, many of these central heating and cooling plant owners and operators are also faced with significant plant replacements, upgrades, or expansions and could benefit greatly from this method.

Cogeneration is not the sole market for this method. While the method is specifically aimed at giving customers potentially much better options than installing a cogen plant, and while the method can be used to optimize existing cogen plant operations, the market segment is larger in that it includes conventional, or separate boiler and chiller energy plants also know as district heating and cooling plants. A key aspect of this method is that it can in many if not most cases illuminate a significantly better central energy plant option that cogeneration for the large market of those considering installing a cogen plant.

Detailed Example

Figure 2:
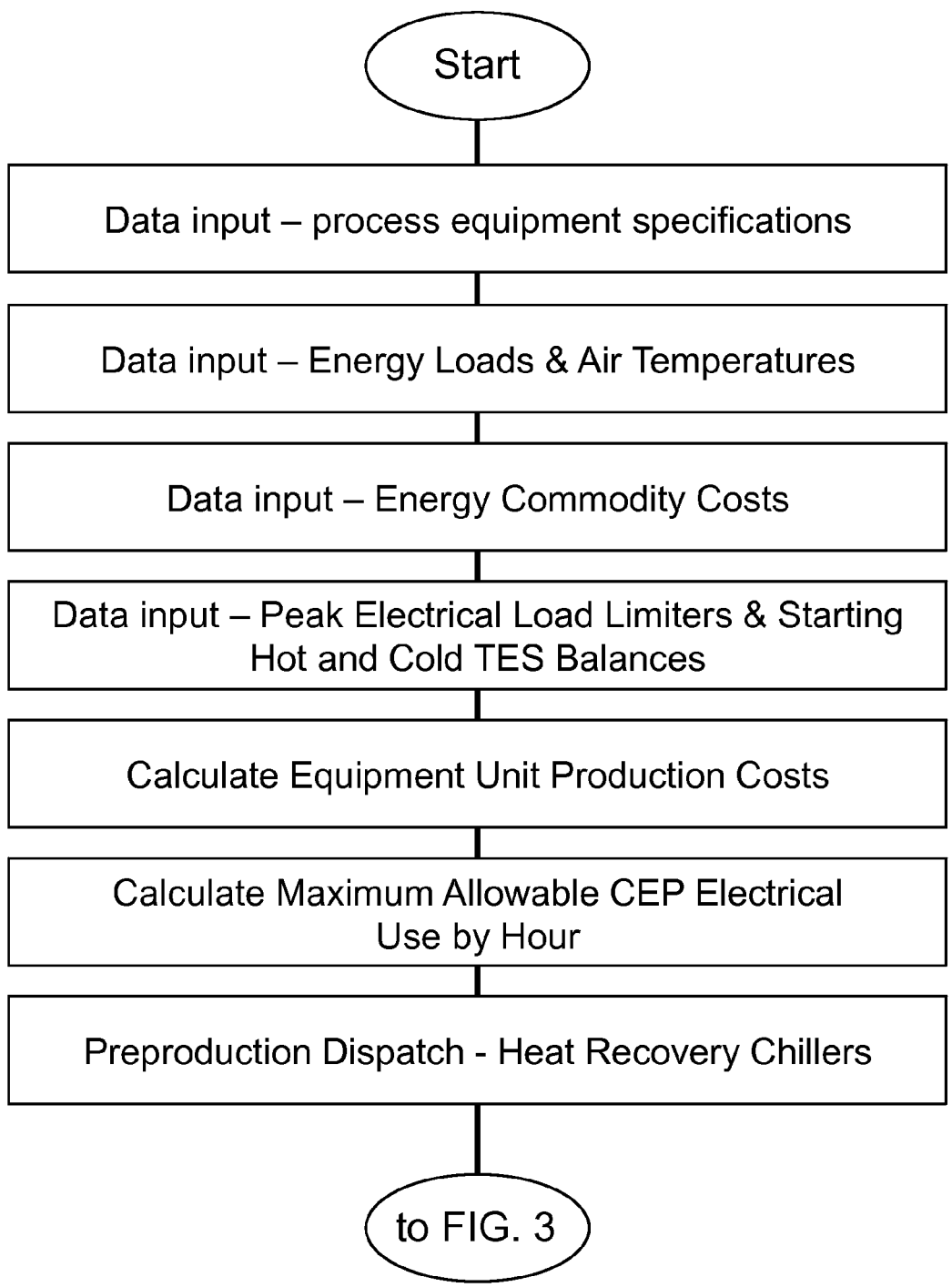
FIGS. 2-4 show a process flowchart according to an exemplary embodiment of the invention for optimal energy plant process and design.
Figure 3:
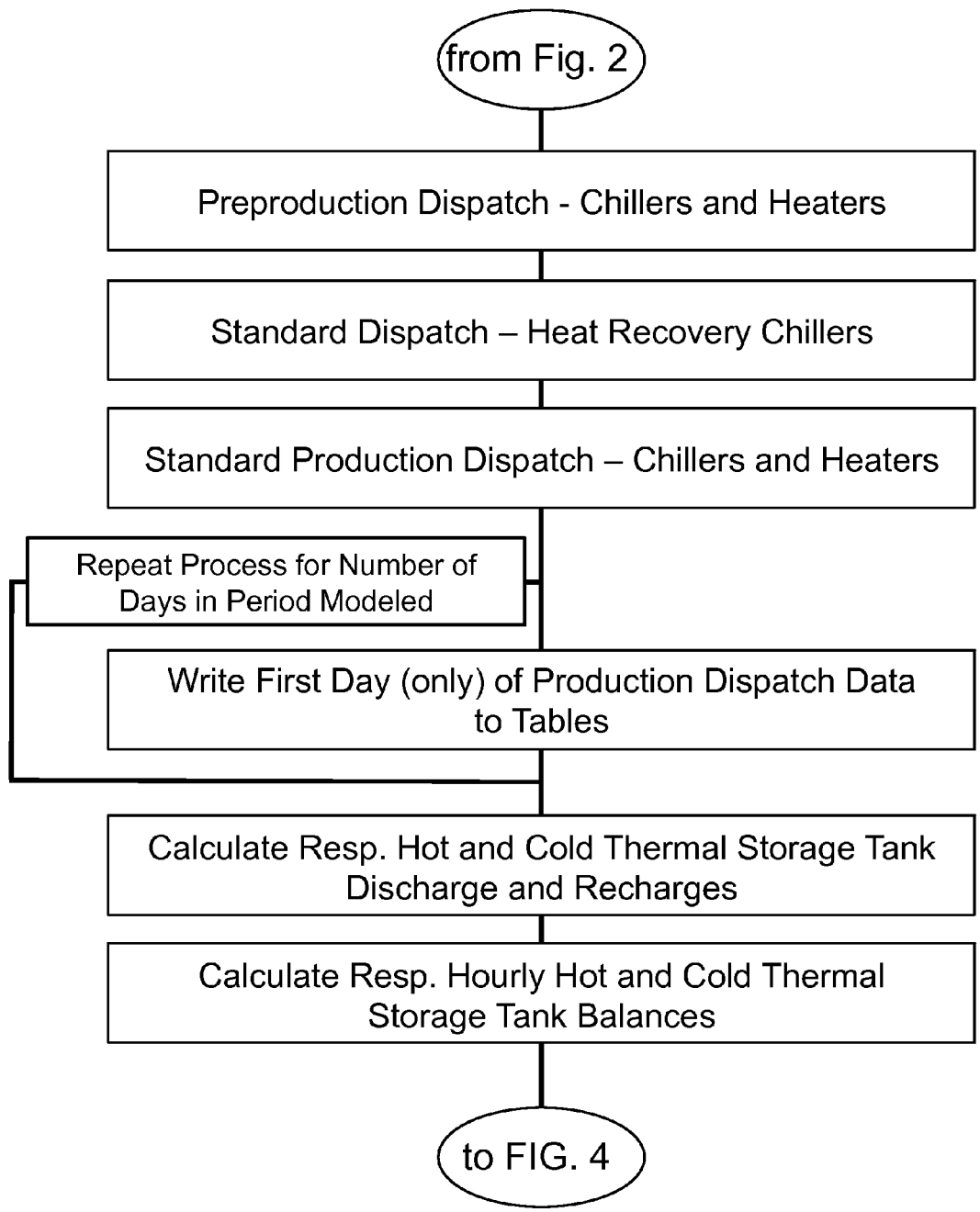
Figure 4:
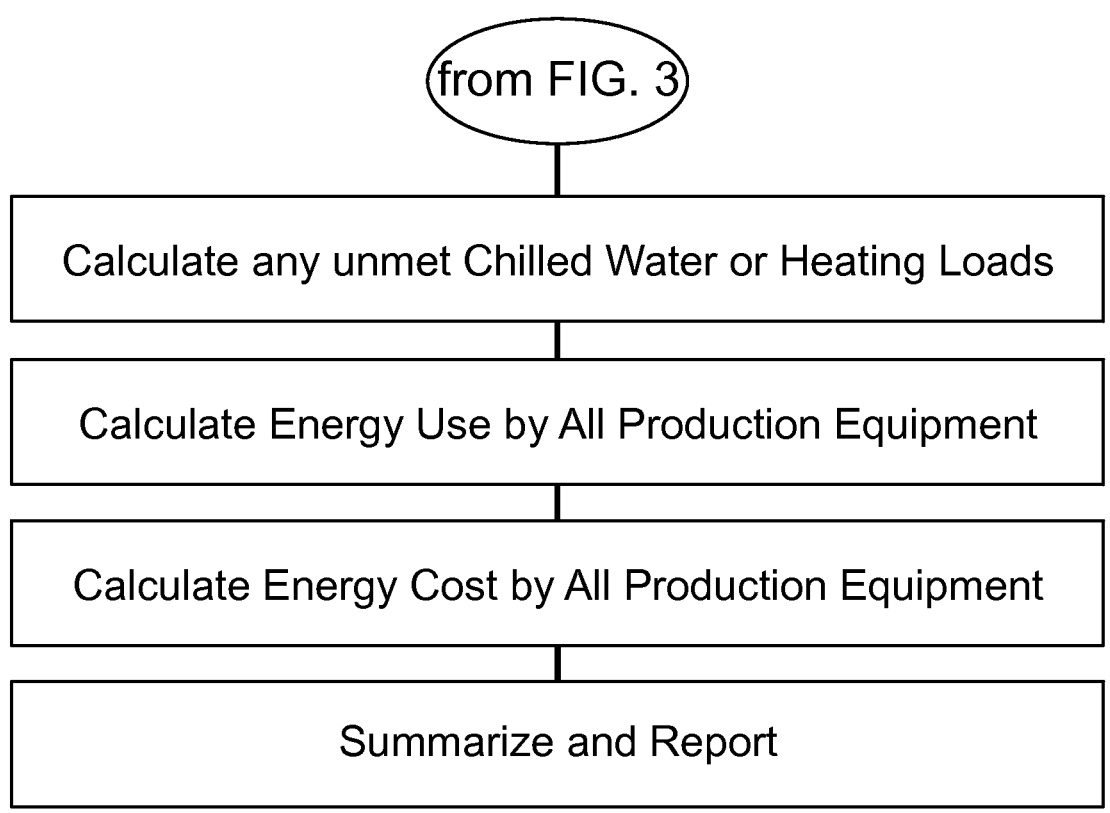

FIGS. 2-4. show an energy plant optimization process flowchart. The paragraph headings in the description infra correspond to the text descriptions in the boxes of FIGS. 2-4.

Data Input—Process Equipment Specifications

Process Equipment Specifications are used as input for the equipment for each hour of the period modeled. In one example, the following process equipment specifications are used:
1. Maximum Operating Capacity
2. Minimum Operating Capacity
3. Maximum Hourly Discharge Rate (Thermal Storage Only)
4. Maximum Hourly Recharge Rate (Thermal Storage Only)
5. Performance Efficiency (units of energy required per unit of work output)

Process Equipment List:
1. Heat Recovery Chillers.
2. Chillers (steam or electric powered).
3. Heaters (hot water generators or boilers).
4. Cold Thermal Storage Tank.
5. Hot Thermal Storage Tank.

Data Input—Energy Loads and Air Temperatures

Energy load and air temperatures are used as input used for each hour of the period modeled. In one example, the following forecasted energy loads and ambient temperatures are used:
1. Campus electrical load before line loss, excluding central energy plant equipment process electrical load.
2. Campus heating load, before line loss.
3. Hot water distribution pumping load, based on facility heating load and system hydraulics.
4. Campus cooling load, before line loss.
5. Chilled water distribution pumping load, based on facility cooling load and system hydraulics.
6. Forecast outside air temperature—wet bulb.
7. Forecast outside air temperature—dry bulb.

Data Input—Energy Commodity Costs

The forecasted energy commodity cost for each type of energy to be used by any piece of process equipment is used as input for each hour of the period modeled, including but not limited to: electricity, natural gas, oil, coal, or the like.

Data Input—Peak Electrical Load Limiters and Starting Hot and Cold TES Balances

Any desired peak electrical load limiter (total facility including central energy plant) for each hour of the period modeled is used as input. In addition, the starting balances in both the hot and cold thermal storage tanks at the beginning of the period to be modeled is used as input.

Calculate Equipment Unit Production Costs

The unit production cost for each piece of process equipment for each hour of the period modeled is calculated by multiplying the unit's production efficiency for that hour times the energy commodity cost for that hour for the type of fuel its uses.

Calculate Maximum Allowable CEP Electrical Use by Hour

The maximum allowable central energy plant electrical use by hour of the period modeled is calculated as the difference between any peak electrical load limiter entered for that hour and the sum of electricity use already forecasted for that hour by all other facility electricity uses, excluding the central energy plant.

Preproduction Dispatch—Heat Recovery Chillers

The minimum respective heating and cooling loads that must be served each hour by central energy plant heating and chilling equipment is calculated, as required due to limitations imposed by the maximum hourly discharge rates for the hot and cold thermal storage tanks, respectively. For example, if the chilled water load on the energy plant were 5,000 ton-hours in a particular hour and the maximum discharge rate of the chilled water thermal storage tank were 4,000 ton-hours per hour then energy plant chilled water production equipment must produce at least 1,000 ton-hours that hour or facility loads would not be met that hour, regardless of whether or not there were any storage in the thermal storage tanks in that hour to be dispatched.

This preproduction dispatch step is required because the main dispatching process in the CEPOM dispatches the total respective hot and cold production work required to meet the total respective loads over the entire period modeled in the order of lowest hourly production cost first regardless of in what hour that may occur. If the total required production work for the period modeled is achieved in economic priority order before the occurrence of an hour where the hourly load exceeds the maximum discharge rate of the thermal storage tank then the load cannot be met that hour regardless of volume available in the thermal storage tank to satisfy the load, due to the tank's maximum hourly discharge rate limiter.

Prior to commencing preproduction dispatch it must be determined, based on forecasted ambient air temperature expected for that hour, if any of the required hourly heating load must be met with heaters instead of heat recovery chillers due to temperature output limitations of the HRCs. For example, suppose the facility hot water distribution system is required to supply water to end user buildings at a temperature of 190 F in a given hour because the outside air temperature is expected to be less than say 40 F and building HVAC systems require hotter supply temps to function properly under those conditions. Furthermore, suppose the HRC equipment specifications indicate that they cannot produce hot water greater than 170 F and therefore HRCs alone cannot produce the required 190 F HW supply temperature that hour and instead some percentage of the HW supply production must come from a hotter source such as the heaters to achieve the required overall average supply temperature. In this case the model cannot allow all required hot water production that hour to come from HRCs and instead it must reserve a certain amount of the required hot water production capacity that hour for the heaters. The model then subtracts this hourly preproduction 'reservation' for heaters from the otherwise required preproduction volume described below, before commencing preproduction dispatch.

The model next assigns the calculated minimum preproduction dispatch volume to heat recovery chillers in the order of lowest unit production cost first, observing any HRC minimum (turndown) or maximum capacity limitations as well as any peak electrical load limiters specified. This is done to minimize the cost of preproduction dispatch by doing the required work with the most cost effective equipment available that hour first. The model also limits HRC preproduction dispatch to the lower of the respective hot water or chilled water loads that hour, as well as the respective hot and cold TES maximum hourly recharge rates, so as not to overproduce one of the two commodities whilst attempting to satisfy the requirements of the other. Also, to minimize overall production cost, the model does not dispatch more than the minimum preproduction dispatch volume required each hour as this would supplant the overall economic dispatching priorities determined and applied in the standard production dispatch process. In the example above, if the preproduction dispatch allowed more than 1,000 tons of equipment work to be dispatched in the hour in question, and the production costs that hour were higher than in another hour during the period modeled where the required work over that 1,000 tons could have been performed, then the overall production cost for the period modeled would not have been minimized. However this economic optimization must be limited with respect to the specific equipment minimum (turndown) capacity in the hour in question, as meeting the loads that hour must take precedence over economics. Therefore, if in the example there were only one heat recovery chiller available that hour, and if its minimum operating capacity (turndown) were say 1,200 tons then 1,200 tons would be dispatched from it in preproduction to meet loads that hour, even though it could theoretically be more economic to perform the extra 200 tons of work in another hour by another piece of equipment with a lower unit production cost.

In CEPOM, to minimize the overall cost of meeting thermal loads, the maximum possible production by heat recovery chillers is achieved by dispatching them to meet as much heating and cooling load as possible within equipment and thermal storage limitations, prior to allowing loads to be met by chillers and heaters. Therefore in both the preproduction dispatch and standard production dispatch processes heat recovery chillers are dispatched first and only the remaining loads that cannot be satisfied by HRCs due to equipment limitations or thermal storage limitations are allowed to be satisfied by chillers and heaters.

Preproduction Dispatch—Chillers & Heaters

After Preproduction Dispatch by Heat Recovery Chillers is performed to minimize overall production costs while assuring hourly loads will be met, the model next completes any required Preproduction Dispatch using conventional chillers and heaters in order to meet the respective remaining hot and chilled water loads required under Preproduction that cannot be met by HRCs.

All the same limitations and priorities applied in HRC preproduction Dispatch are repeated in this process, except application of the combined heating and cooling limiters that assure that the dual duty HRCs do not overproduce one of the two commodities whilst striving to meet the preproduction needs for the other commodity.

Standard Production Dispatch—Heat Recovery Chillers

After all required Preproduction Dispatch by Heat Recovery Chillers, Chillers, and heaters has been performed the model performs the main economic optimization through the Standard Production Dispatch.

In the Standard Production Dispatch the model first attempts to meet all heating and cooling loads remaining after Preproduction Dispatch using Heat Recovery Chillers to minimize overall production cost. To do this the collective remaining heating and cooling loads for the period modeled are dispatched to HRCs in order of lowest hourly production cost, regardless of what hour during the period that may occur, until all loads that can be met with HRCs have been, subject to the following limitations:

1. Peak Electrical Load Limiter—HRC production is limited by the amount of allowable electrical demand remaining in that hour under any imposed Peak Limiter, after electrical usage that hour by previously dispatched equipment has been subtracted from the Peak Limit for that hour.
2. HRC standard production work in any given hour is limited to the maximum respective hot and cold TES hourly recharge rates that hour for situations where there is no load of either or both types that hour and the corresponding production has to be deposited to thermal storage.
3. HRC standard production work in any given hour is limited to the respective hourly hot and chilled water loads that hour for situations where there is either no TES tanks installed or one or both of the TES tanks are already full. If either or both of the tanks are not full then production that hour is limited to the hourly load plus the smaller of the respective TES tank freeboards that hour so as not to overtop either TES tank.
4. HRC standard production work in any given hour is limited to the total respective hot and chilled water work that must be performed over the period modeled for situations where there is sufficient HRC capacity to perform all the required work for the entire period in that hour, in order to avoid overtopping any available TES freeboard and/or performing more work than is required over the entire period in total.
5. HRC standard production work in any given hour is limited to the maximum remaining respective hot or cold water TES freeboard in any future hour after the hour in question, so as not to overtop the respective TES tanks in a future hour.
6. HRC standard production work in any given hour is limited so as to reserve the minimum amount of work required to meet theretofore unmet loads in all hours before the current hour, less the TES storage volume at the beginning of the period modeled, so as to assure that loads in all hours prior to the current one can be met.
7. HRC standard production work in any given hour is limited to the cumulative remaining work required over the period modeled, less any work already performed prior to this hour in Standard or Preproduction Dispatch, so as not to perform more total work than is required over the period being modeled.
8. HRC standard production work in any given hour is limited to the minimum (turndown) capacity of the HRC that hour.
9. HRC standard production work in any given hour is limited to the maximum capacity of the HRC that hour, less any capacity already dispatched from that HRC in Preproduction.

Standard Production Dispatch—Chillers & Heaters

After Standard Production Dispatch by Heat Recovery Chillers is performed in order to minimize overall production costs while assuring hourly loads will be met, the model next completes any required Standard Production Dispatch using conventional chillers and heaters in order to meet any respective remaining hot and chilled water loads required in the period modeled that have not been met already.

All the same limitations and priorities applied in HRC Standard Production Dispatch are repeated in this process, except application of the combined heating and cooling limiters that assure that the dual duty HRCs do not overproduce one of the two commodities whilst striving to meet the preproduction needs for the other commodity.

Write First Day (Only) of Production Dispatch Data to Tables

Write total hourly model dispatched production for each piece of equipment to corresponding day and hour records and fields in a separate production dispatch table for each piece of equipment. This process is repeated for the number of days in the period modeled.

In one example, only the first day of production data is saved and written to tables because after a first cycle of model run for the period in question the start date will be advanced one day and the model rerun to determine the optimum dispatch on that day based on a forward looking reassessment of loads, equipment factors, and energy commodity costs from that point on. This process emulates adept real world plant dispatching techniques that would recognize that each day forward looking weather forecasts, energy prices, equipment availabilities, and other factors affecting plant performance can change. Daily reforecasting and redispatching would assure that the best available forward looking information is used to dispatch plant operation in the most economic way while assuring loads can be met.

Calculate Respective Hourly Hot and Cold Thermal Storage Tank Discharges and Recharges The respective hot and cold thermal storage tank discharges and recharges in each hour are calculated by comparing the load in a given hour to the total production dispatched by the model that hour:

If the total production is greater than the load in a given hour the difference is entered into the corresponding TES Recharge table.

If the total production is less than the load in a given hour the difference is entered into the corresponding TES Discharge table.

Recharge and Discharge tables are then analyzed to assure that all tank limitations are adhered to; for examination of maximum and minimum discharge an recharge rates actually used for the plant configuration modeled, and for other beneficial uses.

Calculate Respective Hourly Hot and Cold Thermal Storage Tank Balances

The respective hot and cold thermal storage tank balances in each hour are calculated by adding or subtracting any Recharge or Discharge that hour to the tank balance in the previous hour.

A full daily and hourly table of TES tank balances is then available for charting and analyzing TES tank balances to make sure all tank limitations are being adhered to; for examination of tank cycling efficiency; for examining tank utilization; and for other beneficial uses.

Calculate any Unmet Chilled Water or Heating Loads

Calculate and store any respective unmet chilling or heating loads as the difference between the respective loads each hour versus the sum of the equipment dispatch and TES discharge amounts that same hour. If the total amount of work dispatched from equipment+discharge from thermal storage is less than the load that hour then there will be unmet load that hour that may need to be remedied by the addition of more production equipment, more TES capacity or recharge and discharge rates, or greater electrical demand amounts.

Calculate Energy Use by all Production Equipment

Calculate and store the energy used by each piece of production equipment as the product of the work dispatched to that piece of equipment each hour times the production efficiency of the piece of equipment that same hour.

Calculate Energy Cost by all Production Equipment

Calculate and store the energy cost for each piece of production equipment as the product of the energy used by that piece of equipment that hour times the unit cost of the respective form of energy commodity that hour.

Summarize and Report

Summarize and Report in tabular and graphical format the equipment production dispatch, equipment utilization, energy cost, energy used, electrical demand, thermal storage balances, and other factors to assess the overall performance of the energy system in meeting the prescribed energy loads.

The following description pertains to exemplary analyses, without any limitation to the scope of the invention, for the different dispatching steps, (A) HRCs Preproduction Dispatching, (B) Chillers Preproduction Dispatching, (C) Heaters Preproduction Dispatching, (D) HRCs Standard Production Dispatching (Chilled Water), (E) HRCs Standard Production Dispatching (Hot Water), (F) Chillers Standard Production Dispatching, and (G) Heathers Standard Production Dispatching.

(A) HRCs Preproduction Dispatching

Is the chilling load in hour 1 is larger than the maximum hourly cold thermal energy storage tank discharge rate?

If NO, Is the heating load in hour 1 larger than maximum hourly hot thermal energy storage tank discharge rate?

If NO, Preproduction dispatch is not required this hour, THEN go to Standard Production.

If YES and if the heating load in hour 1 is less than the maximum hourly hot thermal energy storage tank discharge rate, THEN Start HRC Preproduction dispatch process in hour 1 with HRC of lowest unit production cost in that hour. Proceed through each HRC in that hour in ascending order of production unit cost, then move to hour 2 and repeat until all HRCs in all hours have been dispatched.

Next Hour/HRC for (A)

Is forecast outside air temperature this hour less than minimum allowable without hot water boosting by heaters?

If YES, then calculate amount of heating load this hour that must be producted by heaters to assure heating distribution supply temperatures are adequate for forecasted outside air temperatures this hour (HB).

If NO, then HB=0.

Calculate remaining amount of heating load that must be served by heaters this hour to assure heating loads this hour will be met (HPPH=HLH−HTESMDR−HWH).

Calculate maximum remaining preproduction heating work desired from HRCs: HRCHPPH=HPPH−HB).

Calculate remaining amount of chilling load that must be served by chilling production equipment this hour to ensure chilling loads this hour will be met (CPPH=CLH−CTESMDR−CWH).

Is CPPH>HRCHPPH?

If NO, then calculate required HRC preproduction remaining this hour as: HRCCPPTESMDR=HRCHPPH.

If YES, then calculate required HRC preproduction remaining this hour as limited by TES maximum discharge rates as: HRCCPPTESMDR=CPPH.

Calculate maximum remaining HRC preproduction work allowable this hour as limited by cumulative chilling loads and cold thermal tank freeboard through this hour: HRCCPPCL=CLC+CTESf0−CWC.

Calculate maximum remaining HRC preproduction work allowable this hour as limited by cumulative heating loads and hot thermal tank freeboard though this hour: HRCCPPHL=HLC+HTESf0−HWC.

Calculate maximum remaining HRC preproduction work allowable this hour as limited by HTES maximum hourly recharge rate: HRCPPHTMRR=HLH+HTESMRR−HWH.

Calculate maximum remaining HRC preproduction work allowable this hour as limited by CTES maximum hourly discharge rate: HRCCPPCTMRR=CLH+CTESMRR−CWH.

Calculate maximum remaining HRC preproduction work allowable this hour as limited by maximum allowable hourly peak electrical demand: HRCPPE=(EPH−EPPHRC)/HRC-CPE.

Calculate desired preproduction dispatch for this HRC for this hour, within all load and equipment limitations previously defined: HRCWPPH=min (HRCPPTESMDR, HRC-CPPCL, HRCCPPHL, HRCCPPHTMRR, HRCCPPTMRR, HRCCPPE, HLH, CLH, HRCCAP)

Is HRCWPPH less than HRCCTD?
   If YES, then set HRCCWPPH=0.
   If NO, then store HRCWPPH value for this HRC for this hour.
   Any more hours to HRCs to dispatch?
   If YES, then repeat Next hour/HRC for (A).
   If NO, the proceed with Chillers Preproduction Dispatch (B).

(B) Chillers Preproduction Dispatching

Start chillers preproduction dispatch process in hour 1 with chiller lowest unit production cost in that hour. Proceed through each chiller in that hour in ascending order of production unit cost, then move to hour 2 and repeat until all chillers in all hours have been dispatched.
Next Hour/CHL for (B)

Calculate remaining amount of chilling load that must be served by chilling production equipment this hour to assure chilling loads this hour will be met: CPPH=CLH−CTESMDR−CWH.

Calculate maximum remaining chilling preproduction work allowable this hour as limited by cumulative loads and cold thermal tank freeboard through this hour: CHLPPCL=CLC+CTESf0−CWC.

Calculate remaining chiller preproduction work allowable this hour as limited by CTES maximum hourly recharge rate: CHLPPCTMRR=CLH+CTESMRR−CWH.

Calculate maximum remaining chiller preproduction work allowable this hour as limited by maximum hourly peak electrical demand: CHLPPE=(EPH−EPPHRC)/EPPCHL-CHLPE).

Calculate desired preproduction dispatch for this chiller for this hour within all load and equipment limitations previously defined: CHLPPH=min (CPPH, CHLPPCL, CHLPPCTMRR, CHLPPE, CHLCAP).

Is CHLPPH<CHLTD?
   If YES, then set CHLPPH=0.
   If NO, store CHLPPH value for this CHL for this hour.
   Is CHL a steam fired chiller?
   If YES, then calculate steam required to produce CHLPPH:
     CHLSTM=CHLPPH*CHLPES.
     Store CHLSTM value for this CHL this hour.
   If NO, then are there any more hours or CHLs to dispatch?
     If YES, then Next hour/CHL for (B).
     If NO, then proceed to Heaters Preproduction Dispatching (C).

(C) Heaters Preproduction Dispatching

Start heaters preproduction dispatch process in hour 1 with heater of lowest unit production cost in that hour. Proceed through each heater in that hour in ascending order of production unit cost, then move to hour 2 and repeat until all heaters in all hours have been dispatched.
Next hour/HTR for (C)

Calculate remaining amount of heating load that must be served by heating production equipment this hour to assure heating loads this hour will be met: HPPH=HLH+HB+CHL-STM−HTESMDR−HWH).

Calculate maximum remaining heat preproduction work allowable this hour as limited by cumulative heating loads and hot thermal tank freeboard through this hour: HTRPPHL=HLC+HTESf0−HWC.

Calculated maximum remaining heater preproduction allowable for this hour as limited by HTES maximum hourly recharge rate: HTRPPHTMRR=HLH+HTESMRR−HWH.

Calculate maximum remaining heater preproduction work allowable this hour as limited by maximum allowable hourly peak electrical demand: HTRPPE=(EPH−EPPHRC−EPPCHL−EPPHTR)/HTRPE.

Calculate desired preproduction dispatch for this heater for this hour, within all load and equipment limitations previously defined: HTRPPH=min(HPPH, HTRPPHL, HTRPPHTMMR, HTRPPE, HLH, HTRCAP).

Is HTRPPH<HTRTD?
   If YES, set HTRPPH=0.
   If NO, store HTRPPH value for this HTR (for this hour).
   Are there any more hours or HTRs to dispatch?
     If YES, then Next hour/HTR for (C).
     If NO, then proceed to HRCs Standard Production Dispatching (D).

(D) HRCs Standard Production Dispatching (Chilled Water)

Start HRCs standard CW production dispatch process in hour 1 with HRC of lowest unit production cost in that hour. Proceed through each HRC in that hour in ascending order of production unit cost, then move to hour 2 and repeat until all HRCs in all hours have been dispatched.
Next hour/HRC for (D)

Calculate maximum remaining HRC preproduction work allowable this hour as limited by maximum allowable peak electrical demand: HRCSPE=(EPH−EPPHRC−ESPHRC−EPPCHL−EPPHTR)/HRCPE.

Calculate HRC capacity remaining for standard production after preproduction dispatching: HRCCAPSP=HRCCAP−Σ(HRCPPH).

Calculate maximum remaining HRC standard production work allowable this hour as limited by CTES maximum hourly rate: HRCSPCTMRR=CSLH+CTESMRR−CSWH.

Is CTESBFS>0?
   If YES, calculate minimum CTES freeboard in future hours as: CTESFFS=CTESCAP−CTESBFS.

Calculate maximum CW work that won't overflow tank in future hours nor leave previous hours in deficit: HRCSPCWTESOF=CTESFFS+CTESBPS.

Desired HRC chilled water standard production: HRCSPCW=min(HRCSPE, HRCCAPSP, HRCSPCTMRR, HRCSPCWTESOF).

Are there any more hours or HRCs to dispatch?
     If YES, then Next hour/HRC for (D).
     If NO, then proceed to HRCs Standard Production Dispatching (Hot Water) (E).

(E) HRCs Standard Production Dispatching (Hot Water)

Start HRC standard HW production dispatch process in hour 1 with HRC of lowest unit production cost in that hour. Proceed through each HRC in that hour in ascending order of production unit cost, then move to hour 2 and repeat until all HRCs in all hours have been dispatched.

Next Hour/HRC for (E)

Calculate maximum remaining HRC standard production work allowable this hour as limited by HTES maximum hourly recharge rate: HRCSPHTMRR=HSLH+HTESMRR−HSWH.

Is HTESBFS>0?

If YES, calculate minimum HTES freeboard in future hours: HTESFFS=HTESCAP−HTESBFS.

Calculate maximum HW work that won't overflow tank in future hours nor leave previous hours in deficit: HRCSPHWTESOF=HTESFFS+HTESBPS.

Desired HRC hot water standard production: HRCSPHW=min(HRCCAPSP, HRCSPHTMRR).

Allowable hot water production: HRCSPW=min(HRCSPCW, HRCSPHW).

Is HRCSPW<HRCTD?

If YES, set HRCSPW=0.

If NO, set HRCSPW=min(HRCCAPSP, HRCSPW) and then store HRCSPW value for this HRC for this hour.

Are there any more hours or HRCs to dispatch?

If YES, then Next hour/HRC for (E).

If NO, then proceed to Chillers Standard Production Dispatching (F).

(F) Chillers Standard Production Dispatching

Start CHL standard CW production dispatch process in hour 1 with CHL of lowest unit production cost in that hour. Proceed through each CHL in that hour in ascending order of production unit cost, then move to hour 2 and repeat until all CHLs in all hours have been dispatched.

Next Hour/CHL for (F).

Calculate CHL capacity remaining for standard production after preproduction dispatching: CHLCAPSP=CHLCAP−Σ(CHLPPH).

Calculate maximum remaining CHL standard production work allowable this hour as limited by maximum allowable hourly peak electrical demand: CHLSPE=(EPH−EPPHRC−ESPHRC−EPPCHL−ESPCHL−EPPHTR)/CHLPE Calculate maximum remaining CHL standard production work allowable this hour as limited by CTES maximum hourly recharge rate: CHLSPCTMRR=CSLH+CTESMRR−CSWH.

Is CTESBFS>0?

If YES, calculate minimum CTES freeboard in future hour as: CTESFFS=CTESCAP−CTESBFS.

Calculate maximum CW work that won't overflow tank in future hours nor leave previous hours in deficit: CHLSPCWTESOF=CTESFFS+CTESBPS.

Desired CHL chilled water standard production: CHLSPW=min(CHLSPE, CHLCAPSP, CHLSPCTMRR, CHLSPCWTESOF).

Is CHLSPW<CHLTD?

If YES, set CHLSPW=0.

If NO, store CHLSPH value for this CHL for this hour.

Are there any more hours or CHLs to dispatch?

If YES, then Next hour/CHL for (F).

If NO, then proceed to Heathers Standard Production Dispatch (G).

(G) Heathers Standard Production Dispatching

Start HTR standard HW production dispatch process in hour 1 with HTR of lowest unit production cost in that hour. Proceed through each HTR in that hour in ascending order of production unit cost, then move to hour 2 and repeat until all HTRs in all hours have been dispatched.

Next Hour/HTR for (G).

Calculate HTR capacity remaining for standard production after preproduction dispatching: HTRCAPSP=HTRCAP−Σ(HTRPPH).

Calculate maximum remaining HTR standard production work allowable this hour as limited by maximum allowable hourly peak electrical demand: HTRSPE=(EPH−EPPHRC−ESPHRC−EPPCHL−ESPCHL−EPPHTR−ESPHTR)/CHLPE Calculate maximum remaining HTR standard production work allowable this hour as limited by HTES maximum hourly recharge rate: HTRSPHTMRR=HSLH+HTESMRR−HSWH.

Is HTESBFS>0?

Calculate minimum HTES freeboard in future hours as: HTESFFS=HTESCAP−HTESBFS.

Calculate maximum HW work that won't overflow tank in future hours nor leave previous hours in deficit: HTRSPHWTESOF=HTESFFS+HTESBPS.

Desired HTR hot water standard production: HTRSPW=min(HTRSPE, HTRCAPSP, HTRSPHWTESOF, HTRSPHTMRR).

Is HTRSPW<HTRRTD?

If YES, set HTRSPW=0.

If NO, store HTRSPH value for this HTR for this hour.

Are there any more hours or HTRs to dispatch?

If YES, then Next hour/HTR for (G).

If NO, then sum and write HRC, CHL and HTR hourly preproduction and standard production dispatch amounts to tables.

As one of ordinary skill in the art will appreciate, various changes, substitutions, and alterations could be made or otherwise implemented without departing from the principles of the present invention. For example, the embodiments described could be programmed in executable computer code and stored on a computer medium or storage medium. The method steps could also be codes in various (independent) modules each including one or more method steps. The methods or parts of the steps as modules could also be integrated in semiconductor or computer chips capable of performing or executing the method steps, whereby the chips algorithms could be called and executed as part of an integrated system. In other words, the methods steps could be individual modules or means for executing the methods steps. Furthermore, the embodiments could be a system including an energy plant, a facilities plant and a computer unit interfaced with the plants and/or other computers or Internet systems for providing data (or forecasts) necessary to perform the calculations. Accordingly, the scope of the invention should be determined by the following claims and their legal equivalents.

What is claimed is:

1. A forward-looking method for determining an economically optimal energy dispatching schema to meet heating, cooling and electrical demands, comprising:

(a) having an energy plant comprising a plurality of heating and cooling equipment for producing heat and cooling, wherein said equipment comprises one or more heaters, one or more chillers, one or more heat recovery chillers, one or more hot thermal storage tanks, and one or more cold thermal storage tanks, wherein said equipment consuming electricity for said heating and cooling;

(b) having a facilities plant comprising a plurality of facilities consuming electricity and at least some of said facilities consuming said produced heat and cooling from said energy plant;

(c) a computer-implemented program executable on a computer for determining said economically optimal energy dispatching schema to meet heating, cooling and electrical loads by said energy plant and said facilities plant, wherein said program comprises calculating said optimal energy dispatching schema for each of a plurality of incremental time segments defined in a forward-looking time period by optimizing said combined heating, cooling, and electrical loads using the steps of:

(i) calculating an unmet volume of heating and cooling load that cannot be met by thermal storage discharge from said one or more hot thermal storage tanks and said one or more cold storage tanks;

(ii) calculating a first complementary volume of heating and cooling production to complement said unmet volume of heating and cooling load (i) by using pre-production dispatching from: (j) said one or more heat recovery chillers, (jj) said one or more heaters, (jjj) said one or more chillers, or a combination thereof; and (iii) calculating a second complementary volume of heating and cooling production, thermal storage discharge and thermal storage recharge to complement said unmet volume that cannot be met by (i)-(ii) by using standard production dispatching from: (k) said one or more heat recovery chillers, (kk) said one or more heaters, (kkk) said one or more chillers, or a combination thereof; and (d) using said determined optimal energy dispatching schema for: (p) real time energy dispatching by said energy plant for one or more of said plurality of incremental time segments defined in said forward-looking time period, (pp) an existing energy plant optimization over said forward looking time period, (ppp) a new energy plant planning and design over said forward looking time period or any other forward-looking time period.

2. The method as set forth in claim 1, wherein said program of calculating said optimal energy dispatching schema for each of said plurality of incremental time segments defined in said forward-looking time period further comprises calculating a maximum amount of electricity that may be consumed by said energy plant given a total electricity limitation that may be imposed by one or more aspects of said economically optimal energy determination, by one or more regulatory directions in the interest of electric grid management safety, or a combination thereof.

3. The method as set forth in claim 1, wherein said program of calculating said optimal energy dispatching schema for each of said plurality of incremental time segments defined in said forward-looking time period further comprises calculating any heating supply temperature boost that must be provided by said one or more heaters due to limitations in maximum temperature lift capabilities of said one or more heat recovery chillers.

4. The method as set forth in claim 1, wherein said program of calculating said optimal energy dispatching schema for each of said plurality of incremental time segments defined in said forward-looking time period further comprises determining and using weather forecasts for the facilities to be served by said energy plant.

5. The method as set forth in claim 1, wherein said program of calculating said optimal energy dispatching schema for each of said plurality of incremental time segments defined in said forward-looking time period further comprises determining and using electricity, heating, and cooling loads for said facilities to be served by said energy plant.

6. The method as set forth in claim 1, wherein said program of calculating said optimal energy dispatching schema for each of said plurality of incremental time segments defined in said forward-looking time period further comprises determining and using energy commodity costs for each type of energy to be consumed in said energy plant.

7. The method as set forth in claim 1, wherein said program of calculating said optimal energy dispatching schema for each of said plurality of incremental time segments defined in said forward-looking time period further comprises determining and using an energy efficiency of each of said equipment in said energy plant.

8. The method as set forth in claim 1, wherein said program of calculating said optimal energy dispatching schema for each of said plurality of incremental time segments defined in said forward-looking time period further comprises determining and using an available production capacity of each of said equipment in said energy plant.

9. The method as set forth in claim 1, wherein said program of calculating said optimal energy dispatching schema for each of said plurality of incremental time segments defined in said forward-looking time period further comprises determining and using an available maximum storage capacity, an actual energy storage volume, a maximum recharge rate, a maximum discharge rate, or a combination thereof of said hot and cold thermal storage tanks in said energy plant.

10. The method as set forth in claim 1, wherein the type of energy is electricity, a gaseous fuel, a liquid fuel, a solid fuel, a natural gas, hydrogen, diesel, fuel oil, biomass, or coal.

11. The method as set forth in claim 1, wherein said incremental time segment are user defined.

12. The method as set forth in claim 1, wherein said incremental time segment are defined in seconds, minutes, day, weeks, months, or years.

13. The method as set forth in claim 1, wherein said forward-looking time period is at least seven days and includes at least one weekend.

14. The method as set forth in claim 1, wherein said forward-looking time period is one or more weeks, one or more months, or one or more years.

15. The method as set forth in claim 1, further comprising using said determined optimal energy dispatching schema for design and planning over a second forward looking time period, wherein said second forward looking time period is one or more weeks, one or more months, or one or more years.

* * * * *